(12) United States Patent  
Khor et al.

(10) Patent No.: US 9,298,213 B2  
(45) Date of Patent: Mar. 29, 2016

(54) TRANSFORMING MODULAR DISPLAY SYSTEMS AND METHODS OF USING SAME

(71) Applicants: Soo Hang Khor, Singapore (SG); Kok Chin Leong, Singapore (SG); Seen Yee Cindy Cheong, Singapore (SG); Seow Kwang Steven Foo, Singapore (SG); Timothy David Griffin, Singapore (SG)

(72) Inventors: Soo Hang Khor, Singapore (SG); Kok Chin Leong, Singapore (SG); Seen Yee Cindy Cheong, Singapore (SG); Seow Kwang Steven Foo, Singapore (SG); Timothy David Griffin, Singapore (SG)

(73) Assignee: Dell Products LP, Round Rock, TX (US)

( * ) Notice: Subject to any disclaimer, the term of this patent is extended or adjusted under 35 U.S.C. 154(b) by 160 days.

(21) Appl. No.: 13/775,838

(22) Filed: Feb. 25, 2013

(65) Prior Publication Data

US 2014/0240200 A1    Aug. 28, 2014

(51) Int. Cl.
*G06F 1/16* (2006.01)
*F16M 11/00* (2006.01)

(52) U.S. Cl.
CPC ............. *G06F 1/1601* (2013.01); *F16M 11/00* (2013.01); *G06F 2200/1612* (2013.01)

(58) Field of Classification Search
CPC ....... A01H 5/10; A01H 1/04; C12N 15/8241; C12N 15/8245; C12N 15/8247; C12N 15/8251; C12N 15/8271; C12N 15/8274; C12N 15/8279

USPC .......... 345/1.3; 361/679.22; 248/125.8, 122.1
See application file for complete search history.

(56) References Cited

U.S. PATENT DOCUMENTS

| | | |
|---|---|---|
| 6,275,375 B1 | 8/2001 | Nam |
| 6,499,704 B2 | 12/2002 | Oddsen, Jr. |
| 7,195,214 B2 | 3/2007 | Lee et al. |
| 7,237,755 B2 | 7/2007 | Cho et al. |
| 7,433,185 B1 | 10/2008 | Curran et al. |
| 7,567,436 B2 | 7/2009 | Jeong |
| 7,604,206 B2 | 10/2009 | Jung et al. |
| 7,652,876 B2 | 1/2010 | Moscovitch |
| 7,819,368 B2 | 10/2010 | Jung et al. |
| 8,083,193 B2 | 12/2011 | Matsui et al. |
| 2005/0002159 A1* | 1/2005 | Jeong ............................ 361/683 |
| 2005/0006537 A1* | 1/2005 | Jung et al. ..................... 248/133 |
| 2006/0126284 A1* | 6/2006 | Moscovitch .................. 361/681 |
| 2009/0278006 A1 | 11/2009 | Park et al. |
| 2010/0219303 A1 | 9/2010 | Matsui et al. |
| 2011/0075345 A1 | 3/2011 | Moscovitch |

* cited by examiner

*Primary Examiner* — Olga Merkoulova
(74) *Attorney, Agent, or Firm* — Egan, Peterman, Enders & Huston LLP.

(57) ABSTRACT

Modular display monitor systems are disclosed that employ a multi-purpose base component that may be used in a first configuration as part of a stand riser assembly for supporting a display monitor component in an upright viewing position with a separate riser component, and that may be used in a second configuration together with a separate support arm as part of an arm mount assembly for attaching a display monitor component to a wall or desktop without the riser component.

26 Claims, 4 Drawing Sheets

TRANSFORMING MODULAR DISPLAY SYSTEMS AND METHODS OF USING SAME

FIELD OF THE INVENTION

This application relates to display devices, and more particularly to display devices for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional flat panel display monitors (LCD or LED monitor) for information handling systems are often provided with a separate desktop stand assembly for supporting a display monitor component in an upright viewing position. The stand assembly typically includes a riser component that connects the display monitor component to a base component which has a relatively large footprint and is designed to rest upon a surface such as tabletop or desktop in a manner that supports the stand assembly and display monitor component in a stable upright viewing position for the user. Some flat panel display monitors are provided with electrical components that are integral to the display monitor component itself together with various corresponding electrical connectors for connecting electrical cables from an information handling system and AC mains directly to the display monitor.

One type of conventional stand assembly for a display monitor employs a base component that houses one or more electrical components that provide for convenient electrical and signal connection of the monitor component to an information handling system and to AC mains power. Such electrical components include video input connectors (e.g., HDMI, VGA, DVI, DP etc.) and audio input connectors (e.g., stereo mini-plug) for connection to an information handling system, AC power input for connection to AC mains with a corresponding AC/DC power converter for supplying DC power to the display monitor component, USB input connections for coupling to the information handling system together with corresponding output connectors for accepting user USB devices, Ethernet port for coupling to a network Ethernet cable, etc. Conductor wires extending along or within the riser component are typically provided to electrically couple one or more of these electrical components of the base component to corresponding electrical components of the display monitor component.

Flat panel display monitors are also configured for fixed mounting to a wall or desk by a separate support arm which may be articulated. The support arm includes a first mounting bracket on a first end for attachment by bolts or screws to a fixed surface such as a wall or desktop. The second end of the support arm typically includes a second mounting bracket for attaching the support arm to the separate display monitor component with Video Electronics Standards Association ("VESA") mounting holes and fasteners. Electrical components for such fixed-mount display monitors are typically provided integral to the monitor component itself together with various corresponding electrical connectors for the display monitor.

SUMMARY OF THE INVENTION

Disclosed herein are modular display systems that employ a multi-purpose base component that houses one or more electrical components (e.g., as an electrical chassis) for a display monitor component. The multi-purpose base component may be used in a first configuration as part of a stand riser assembly for suspending a display monitor component (e.g., on a desktop) in a viewing position with a separate riser component, and may be used in a second configuration together with a separate support arm as part of an arm mount assembly for attaching a display monitor component (e.g., to a wall or desktop) to suspend the display monitor component in a viewing position without the riser component. The disclosed systems and methods may advantageously implemented in one embodiment to provide a display monitor and a corresponding separate base component having integral electrical components for the display monitor, in which the same base component may be used with the same display monitor component for either a stand riser assembly configuration (e.g., freely resting on a tabletop/desktop) or for an arm mount assembly (e.g., mounted to a wall or table/desktop). Thus, the same pair of separate display monitor and base assembly components may be used to provide multiple installation options. In one embodiment, an arm mount assembly using a support arm mounted to a desktop may be desired by a user, for example, to achieve more free desk space underneath the display monitor component than is possible with a stand riser assembly configuration positioned to freely rest on the desktop.

In one respect, disclosed herein is a modular display system, including: a display monitor head component that includes one or more integrated display monitor electrical components; and a base component including one or more integrated base component electrical components. The base component may be configured to electrically and mechanically mate with a riser component that is electrically and mechanically mated to the display monitor head component to implement a stand riser assembly configuration. The base component may be further configured to electrically and mechanically mate to the display component and to mechanically mate between the display monitor head component and a support arm component to implement an arm mount assembly configuration.

In another respect, disclosed herein is a method of suspending a viewing surface of a display monitor head component. The method may include performing at least one of the following two steps: implementing a stand riser configuration by providing a base component, riser component and display monitor head component, and electrically and mechanically mating the base component with the riser component and electrically and mechanically mounting the riser component to the display monitor head component, the base component including one or more integrated base component electrical components and the display monitor head component including one or more integrated display monitor electrical components, or implementing an arm mount assembly configuration by providing the base component, the display monitor head component and a support arm component, and electrically and mechanically mating the base component to the display monitor head component and mechanically mounting the base component to the support arm component such that the base component is mechanically coupled between the display monitor head component and the support arm component. The method may be implemented with a base component that is configured to electrically and mechanically mate with the riser component while the riser component is electrically and mechanically mated to the display monitor head component to implement the stand riser configuration. The method may also be implemented with a base component that is further configured to electrically and mechanically mate with the display monitor head component and to mechanically mate between the display monitor head component and the support arm component to implement the arm mount assembly configuration.

DESCRIPTION OF ILLUSTRATIVE EMBODIMENTS

Figure 1:
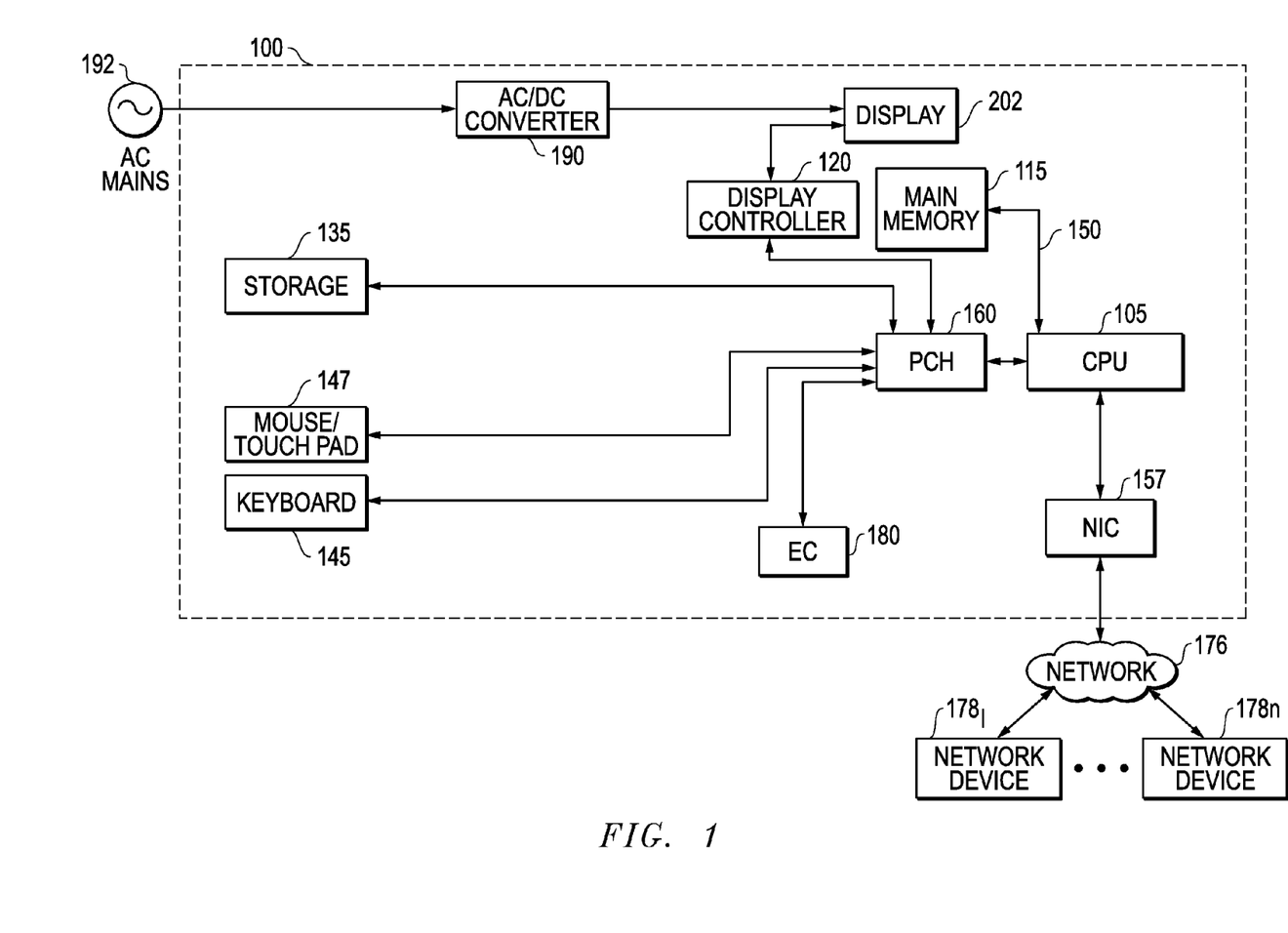
FIG. 1 illustrates a block diagram of an information handling system as it may be configured according to one exemplary embodiment of the disclosed systems and methods.

FIG. 1 is a block diagram of an information handling system 100 as it may be configured according to one exemplary embodiment of the disclosed systems (e.g., desktop computer, tower computer, portable computer such as laptop computer, etc.). As shown in FIG. 1, information handling system 100 of this exemplary embodiment includes at least one processing device 105, which may be a central processing unit CPU as shown such as an Intel Pentium series processor, an Advanced Micro Devices (AMD) processor, or which may be one of many other suitable processing devices. In this embodiment, CPU 105 executes an operating system (OS) for system 100. In this exemplary embodiment, CPU 105 is provided with an integrated memory controller (iMC) to facilitate memory functions, although it will be understood that a memory controller may be alternatively provided as a separate chip or other circuit in other embodiments. Main system memory 115 may be coupled via DDR channel 150 as shown to CPU 105.

Still referring to the exemplary embodiment of FIG. 1, a display monitor head component 202 (e.g., LCD display, LED display or other suitable flat panel display device) is coupled to display controller 120 to provide visual images to the user. Display controller 120 is in turn coupled to processing device 105 via platform controller hub (PCH) 160 which facilitates input/output functions for the information handling system 100. AC/DC power converter 190 is shown coupled in this embodiment to AC Mains 192 for converting AC power to suitable DC power for display monitor head component 202. Local system storage 135 (e.g., one or media drives such as hard disk drive/s, optical drives, NVRAM, Flash or any other suitable form of internal or external storage) may be coupled to PCH 160 and its controller chip to provide permanent storage for the information handling system. Input devices such as a keyboard 145 and mouse/touchpad 147 may be optionally coupled to PCH 160 and its controller chip to enable the user to interact with the information handling system 100 and programs or other software/firmware executing thereon. An embedded controller (EC) 180 running system firmware may be coupled to PCH chip 160 as shown.

Also shown coupled to processing device 105 for this exemplary embodiment is network interface card (NIC) 157 that may be optionally provided to enable wired and/or wireless communication across network 176 (e.g., such as the Internet or local corporate intranet) with various multiple information handling systems configured as network devices $178_1$-$178_n$. It will be understood that the particular configuration of FIG. 1 is exemplary only, and that an information handling system may be configured with fewer, additional or alternative components than those illustrated in FIG. 1. It will be understood that in some embodiments CPU 105, graphics display controller 120, PCH 160, EC 180, etc. may be implemented as separate chips/devices, wherein for other embodiments they may be integrated onto a common device/chip. It will be understood that it is possible that one or more components of information handling system 100 (e.g., those components of information handling system 100 illustrated in FIG. 1, and/or other suitable components of an information handling system) may be provided integral to the same chassis as display monitor head component 202.

Figure 2:
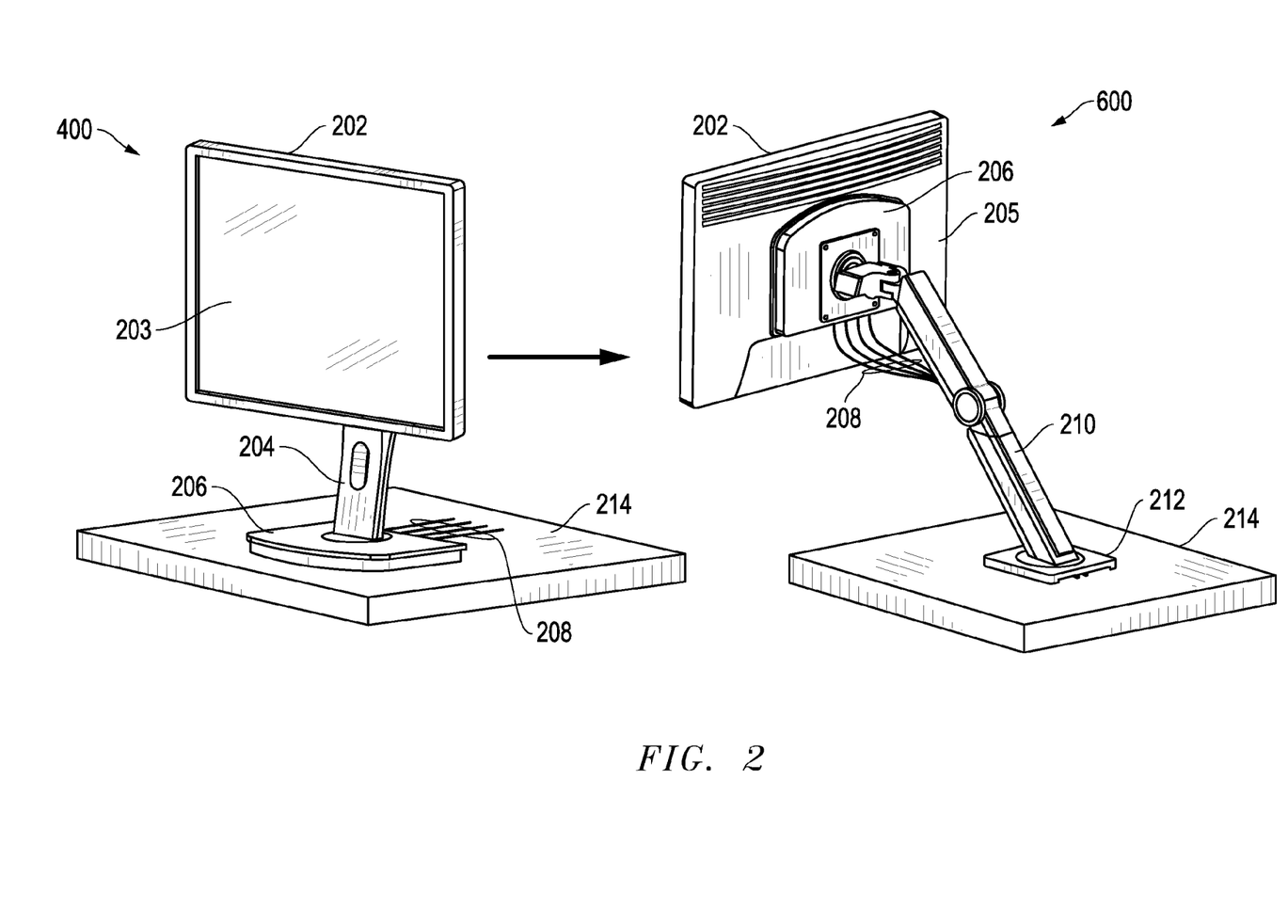
FIG. 2 illustrates a perspective view of a modular display system according to one exemplary embodiment of the disclosed systems and methods.

FIG. 2 illustrates one exemplary embodiment of a modular display system that may be implemented so that the chassis of a common display monitor head component 202 may be transformed from a stand riser assembly configuration 400 to an arm mount assembly configuration 600. As will be further described herein, display monitor head component 202 may be supported in a stand riser assembly configuration 400 on a substantially horizontal support surface 214 (e.g., desktop, tabletop, etc.) by a riser component 204 received by a multi-purpose base component 206. In the stand riser assembly configuration 400, base component 206 rests freely (i.e., in a non-attached condition) on support surface 214 as shown. The base component 206 may have a chassis having one or more integrated electrical components for coupling to integrated electrical components of a chassis of the display monitor head component 202.

Examples of display monitor components that may be integrated in a chassis of display monitor head component 202 include, but are not limited to, liquid crystal panels, backlight/s for the liquid crystal panels, audio speakers, user USB ports, etc. Examples of base component electrical components that may be integrated within the chassis of base component 206 include, but are not limited to, video input connectors (e.g., HDMI, VGA, DVI, DP etc.) and audio input connectors (e.g., stereo mini-plug) for connection to a separate and external information handling system (e.g., desktop tower computer, notebook computer, etc.) or other external audio or video devices or systems, AC power input for connection to external AC mains 192 with a corresponding optional AC/DC power converter 190 integrated within the base component 206 for supplying DC power to the display monitor component, one or more USB input connections (USB upstream and/or USB downstream) for coupling to the external information handling system together with optional corresponding output connectors provided on the base component for accepting external user USB devices such as thumb drives or other USB-compatible devices, an Ethernet port for coupling to an external network Ethernet cable, etc. Thus, it will be understood that cables 208 or any other suitable electrically conductive medium may be employed to make one or more external connections between integrated base component electrical components and one or more external components, external device/s, external system/s, external network/s, etc. that are external to a modular display system.

In stand riser assembly configuration 400 of FIG. 2, cables 208 may be coupled from a separate and external information handling system (not shown) to various connectors and electronic components of base component 206. In an alternative embodiment, display monitor head component 202 and/or base component 206 may include one or more (or all) processing devices, memory devices, and hub/bus components of information handling system 100 within the chassis of components 202 and/or 206. In this latter embodiment, cables 208 may include, for example, AC mains power cable, and input device cables for keyboard 145 and/or mouse/touchpad 147. In either case, conductor wires may extend with the riser component 204 (e.g., externally or internally) along or within the riser component 204 between the base component 206 and display monitor head component 202.

In arm mount assembly configuration 600 of FIG. 2, the same display monitor head component 202 used for stand riser assembly configuration 400 is now shown coupled to a first end of a separate articulatable support arm component 210 with base component 206 positioned therebetween and directly coupled to the rear side 205 of display monitor head component 202. As shown in FIG. 2, a second and opposite end of support arm component 210 may be fixedly attached with suitable fasteners or adhesive to a substantially horizontal support surface 214 by a mounting bracket 212. It will be understood that support arm component 210 may be similarly attached by mounting bracket 212 to a support surface having an orientation other than horizontal, e.g., such as a substantially vertical or angled wall, etc. In the illustrated embodiment, cables 208 extend down and alongside support arm component 210 for coupling to an information handling system, mains power, network, etc. However, it is also possible that cables 208 may be internally routed between first and second ends of support arm component 210 in a manner similar to riser component 204. As will be further described herein, the same base component 206 (together with its integrated electrical components) may be advantageously employed for either the stand riser assembly configuration 400 or the arm mount assembly configuration 600. In this regard, base component 206 may be configured to electrically and mechanically mate with both riser component 204 and support arm component 210 to implement either configuration 400 or 600 as desired. Moreover base component 206 may be configured to electrically and mechanically mate between display monitor head component 202 and support arm component 210 to implement arm mount assembly configuration 600.

Figure 3:
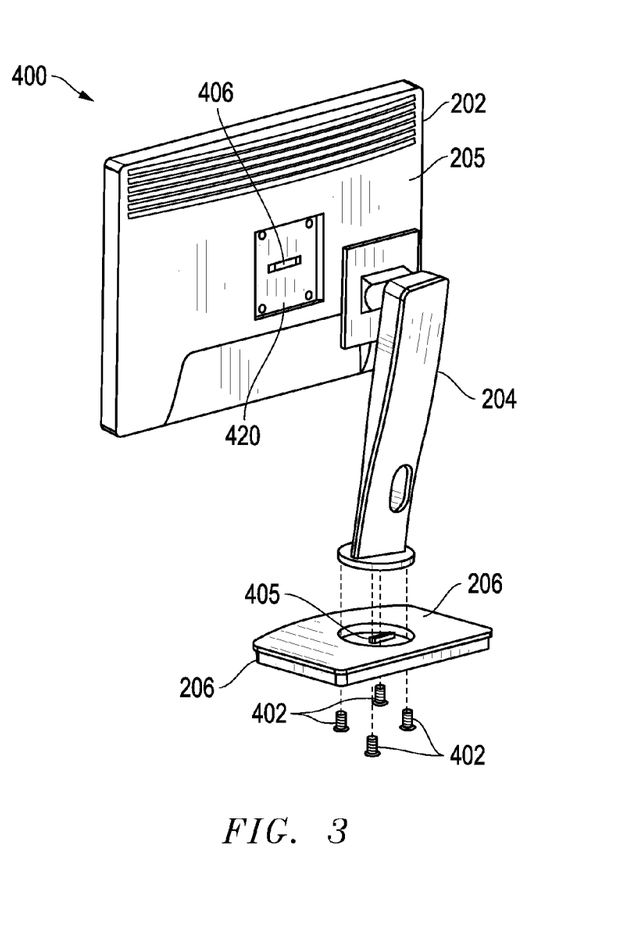
FIG. 3 illustrates an exploded perspective view of a modular display system according to one exemplary embodiment of the disclosed systems and methods.
Figure 4:
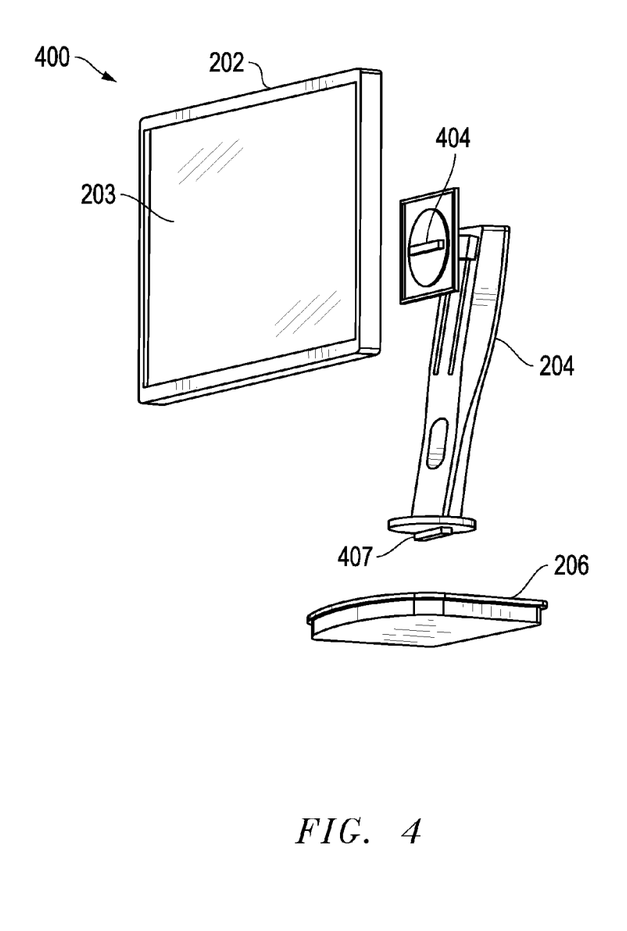
FIG. 4 illustrates an exploded perspective view of a modular display system according to one exemplary embodiment of the disclosed systems and methods.

FIGS. 3 and 4 illustrate respective rear and front exploded perspective views showing the operational arrangement of the components of stand riser assembly configuration 400 of the exemplary modular display system embodiment of FIG. 2. As shown in FIGS. 3 and 4, display monitor head component 202 has a front viewing side 203 and a rear side 205 that is opposite the front viewing side 203. Display monitor head component 202 is configured with a monitor electrical interconnect 406 (e.g., male electrical interconnect) on a surface of the rear side 205 of display monitor head component 202 that is configured for electrically mating (i.e., so as to make electrical connection) with a corresponding first electrical interconnect 404 (e.g., female electrical interconnect) provided on a first end of riser component 204 to interconnect electrical components of base component 206 with corresponding electrical components within display monitor head component 202 via one or more appropriate electrical cables disposed inside the body of riser component 204 and extending between the opposing ends of riser component 204. The first end of riser component 204 itself is configured for mechanically mating with the rear side 205 of the display monitor head component 202 to support the front viewing side 203 of display monitor head component 202 in a suspended viewing position with electrical interconnects 406 and 404 disposed in mated electrical relationship, for example using appropriate fasteners such as screws or bolts, or by using a quick release mechanism such as a releasable latch mechanism that holds the components together in mated condition. In this latter embodiment, such a releasable latch mechanism may be activated by a quick release actuator 420 (e.g., quick release button) as shown in FIG. 3 to allow selectable disconnection (un-mating) of first end of riser component 204 from rear side 205 of the display monitor head component 202 and selectable disconnection (un-mating) of electrical interconnects 406 and 404.

As further shown in FIGS. 3 and 4, a second end of riser component 204 is configured with second electrical interconnect 407 (e.g., female electrical interconnect) that is configured for electrically mating with a corresponding electrical interconnect 405 (e.g., male electrical interconnect) provided on the upper side of base component 206 to interconnect electrical components of base component 206 with corresponding electrical components of display monitor head component 202 via electrical cables disposed inside the body of riser component 204. As shown the second end of riser component 204 is also configured for mechanically mating with the upper side of base component 206, which is in turn configured to be of sufficient size and mass to support the combined mated assembly of display monitor head component 202 and riser component 204 with electrical interconnects 407 and 405 disposed in mated electrical relationship. In the exemplary embodiment of FIG. 3, second end of riser component 204 may be secured to base component 206 in mated mechanical relationship using one or more fasteners 402 (e.g., screws or bolts), which may be removed to allow disconnection (un-mating) of the components. However, any other suitable manner of securing second end of riser component 204 to base component 206 may be employed, e.g., such as a quick release (e.g., latching) mechanism which may be activated by a quick release actuator in a manner similar to previously described for the first end of riser component 204.

Figure 5:
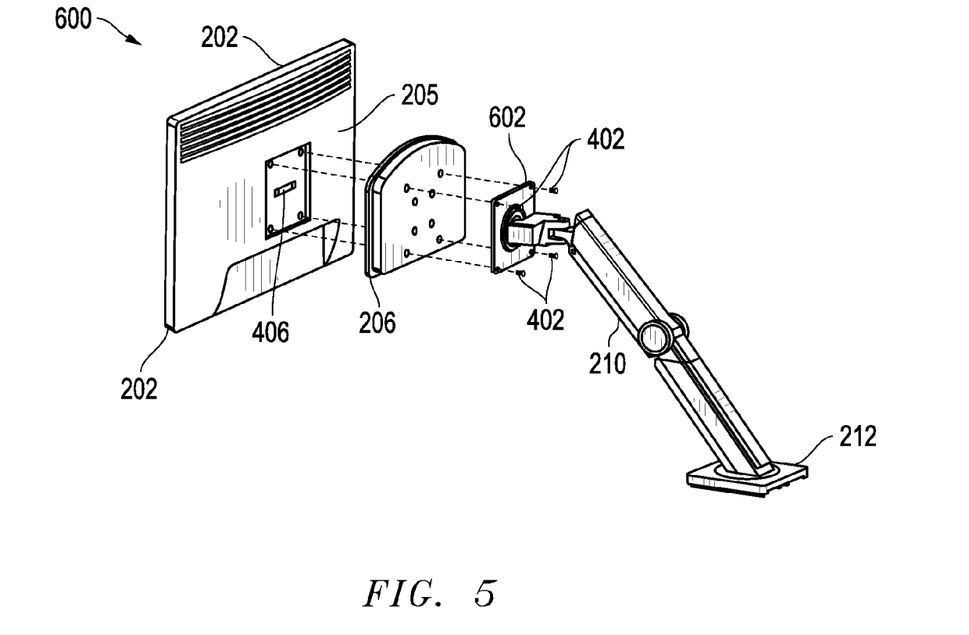
FIG. 5 illustrates an exploded perspective view of a modular display system according to one exemplary embodiment of the disclosed systems and methods.
Figure 6:
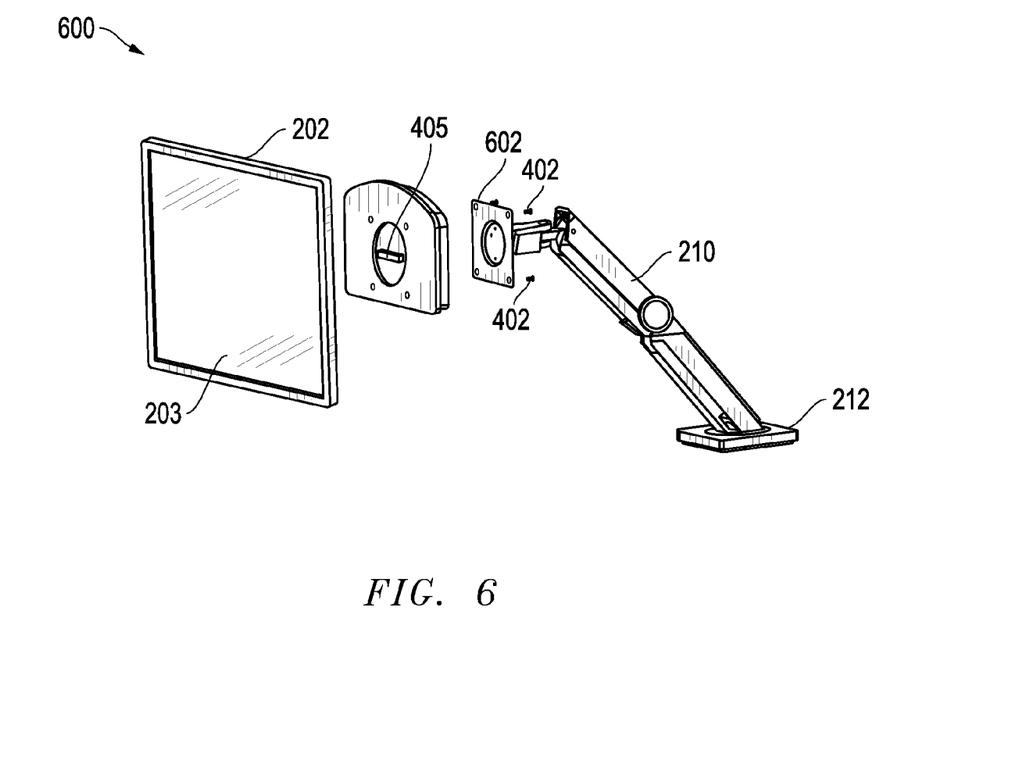
FIG. 6 illustrates an exploded perspective view of a modular display system according to one exemplary embodiment of the disclosed systems and methods.

FIGS. 5 and 6 illustrate respective rear and front exploded perspective views showing the operational arrangement of the components of the arm mount assembly configuration 600 of the exemplary modular display system embodiment of FIG. 2. As shown in FIGS. 5 and 6, the same display monitor head component 202 used to implement configuration 400 of FIGS. 3 and 4 may also be used to implement configuration 600 of FIGS. 5 and 6. However, in this embodiment, the upper side of base component 206 of FIGS. 3 and 4 is now repositioned for mechanical and electrical mating directly with the rear side 205 of display monitor head component 202 using one or more fasteners 402 (e.g., screws or bolts), it being understood that any other suitable manner of securing the upper side of base component 206 to the rear side 205 of display monitor component 202 may be employed, e.g., such as a quick release (e.g., latching) mechanism which may be activated by a quick release actuator in a manner similar to previously described for the first end of riser component 204.

As shown in FIGS. 5 and 6, the lower side (side opposite the upper side) of base component 204 is further configured to in turn mechanically mate with a first end of support arm component 210 to support display monitor head component 202 in a suspended viewing position. In one exemplary embodiment, the first end of support arm component 210 may be provided with a VESA compliant bracket 602 configured for mounting with fasteners 402 to a corresponding VESA compliant fastener pattern (100 mm×100 mm mounting holes) provided as shown on the lower side of base component 206, with fasteners 402 extending through base component 206 to corresponding VESA compliant fastener pattern openings defined in the rear side 205 of display monitor head component 202 such that fasteners 402 act to secure bracket 602 to rear side 205 of display monitor head component 202 with base component 206 disposed between bracket 602 and rear side 205 of display monitor head component 202. However, any other suitable configuration of supporting bracket and/or fastener pattern (or other suitable attachment configuration) may be employed to attach display monitor head component 202 to a first end of a support arm component 210.

As further shown in FIGS. 5 and 6, electrical interconnect 405 on the upper side of base component 206 is configured to mate directly with the electrical interconnect 406 on rear side 205 of display monitor head component 202 to interconnect electrical components of base component 206 with corresponding electrical components of display monitor head component 202 when the upper side of base component 206 is mechanically mated with the rear side 205 of display monitor head component 202. As previously described, cables 208 may be routed alongside or inside support arm component 210.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A modular display system, comprising:
   a display monitor head component including one or more integrated display monitor electrical components;
   a base component including one or more integrated base component electrical components;
   where the base component is configured to electrically and mechanically mate with a riser component that is electrically and mechanically mated to the display monitor head component with the riser component positioned between the base component and the display monitor to implement a stand riser assembly configuration; and
   where the same base component that is configured to mate with the riser component to implement the stand riser assembly configuration is also configured to electrically and mechanically mate instead without the riser component to the display component and to mechanically mate between the display monitor head component and a support arm component to implement an arm mount assembly configuration.

2. The system of claim 1, where the base component electrical components are configured for coupling to make one or more electrical connections that are external to components of the modular display system.

3. The system of claim 1, where the base component electrical components are configured for coupling to make one or more electrical connections to one or more information handling system components that are external to components of the modular display system.

4. The system of claim 1, where the display monitor head component has a viewing side and a rear side and the one or more integrated display monitor electrical components are electrically coupled to at least one monitor electrical interconnect disposed on the rear side of the display monitor head component; where the base component has an upper side and a lower side and the one or more integrated base component electrical components are electrically coupled to at least one base component electrical interconnect disposed on the upper side of the base component; and where the upper side of the base component is configured to mechanically mate with the rear side of the display monitor head component and the base component electrical interconnect is configured to electrically mate with the monitor electrical interconnect to electrically couple the base component electrical components to the display monitor electrical components when the upper side of the base component is mechanically mated with the rear side of the display monitor head component.

5. The system of claim 4, where the base component electrical components are configured for coupling to make one or more electrical connections to one or more information handling system components that are external to the modular display system.

6. The system of claim 4, where the lower side of the base component is configured to mechanically mate with a first end of a support arm; and where a second and opposite end of the support arm is configured for attachment by fasteners or adhesive to a supporting surface to implement the support arm configuration to support the mated base component and display monitor head component assembly with the display monitor head component suspended in a viewing position for a user.

7. The system of claim 4, where the rear side of the display monitor head component is configured to mechanically mate with a first end of the riser component and the monitor interconnect is configured to electrically mate with at least one corresponding first riser electrical interconnect disposed adjacent the first end of the riser component when the rear side of the display monitor head component is mechanically mated to the first end of the riser component; where the upper side of the base component is configured to mechanically mate with a second and opposite end of the riser component and the base component electrical interconnect is configured to electrically mate with at least one corresponding second riser electrical interconnect disposed adjacent the second end of the riser electrical component when the upper side of the base component is mechanically mated with the second end of the riser component; where the first riser electrical interconnect is electrically coupled though the riser component to the second riser electrical interconnect to electrically couple the integrated display monitor electrical components to the integrated base component electrical components; and where the rear side of the display monitor head component is configured to mechanically mate with the first end of the riser component at the same time that the upper side of the base component is mechanically mated with the second and opposite end of the riser component to implement the stand riser configuration.

8. The system of claim 7, where the lower side of the base component is configured to freely rest upon a substantially horizontal support surface to support the mated riser component and display monitor head component assembly with the display monitor head component suspended in a viewing position for a user.

9. The system of claim 1, where the display monitor head component has a viewing side and a rear side and the one or more integrated display monitor electrical components are electrically coupled to at least one monitor electrical interconnect disposed on the rear side of the display monitor head component; where the base component has an upper side and a lower side and the one or more integrated base component electrical components are electrically coupled to at least one base component electrical interconnect disposed on the upper side of the base component; where the rear side of the display monitor head component is configured to mechanically mate with a first end of the riser component and the monitor interconnect is configured to electrically mate with at least one corresponding first riser electrical interconnect disposed adjacent the first end of the riser component when the rear side of the display monitor head component is mechanically mated to the first end of the riser component; where the upper side of the base component is configured to mechanically mate with a second and opposite end of the riser component and the base component electrical interconnect is configured to electrically mate with at least one corresponding second riser electrical interconnect disposed adjacent the second end of the riser electrical component when the upper side of the base component is mechanically mated with the second end of the riser component; where the first riser electrical interconnect is electrically coupled though the riser component to the second riser electrical interconnect to electrically couple the integrated display monitor electrical components to the integrated base component electrical components; and where the rear side of the display monitor head component is configured to mechanically mate with the first end of the riser component at the same time that the upper side of the base component is mechanically mated with the second end of the riser component to implement the stand riser configuration.

10. The system of claim 9, where the lower side of the base component is configured to rest upon a substantially horizontal support surface to support the mated riser component and display monitor head component assembly with the display monitor head component suspended in a viewing position for a user.

11. The system of claim 1, where the display monitor and base assembly components of the modular display system are configured to be transformed from the stand riser configuration to the arm mount assembly configuration by unmating the riser component from the display monitor head component and removing the riser component from position between the base component and the display monitor, and then electrically and mechanically mating the base component to the display monitor head component and mechanically mounting the base component to the support arm component such that the base component is mechanically coupled between the display monitor head component and the support arm component to implement the arm mount assembly configuration without the riser component.

12. The system of claim 1, where the display monitor head component has a rear surface; and where the base component is further configured to electrically and mechanically mate directly to the rear surface of the display component and to mechanically mate between the display monitor head component and a support arm component to implement the arm mount assembly configuration.

13. The system of claim 1, where the riser component and the support arm component are separate and different components that are each removable from the base component; and where the base component is configured to electrically and mechanically mate with either one of the riser component and the separate and different support arm component so as to allow a user to selectably implement either the stand riser configuration with the riser component positioned between the base component and the display monitor without the presence of the support arm component, or the arm mount assembly configuration with the same base component mechanically positioned between the display monitor head component and the support arm component without the presence of the riser component.

14. A method of suspending a viewing surface of a display monitor head component, comprising:
   providing a modular display system, comprising:
      a display monitor head component including one or more integrated display monitor electrical components,
      a base component including one or more integrated base component electrical components,
      where the base component is configured to electrically and mechanically mate with a riser component that is electrically and mechanically mated to the display monitor head component with the riser component positioned between the base component and the display monitor to implement a stand riser assembly configuration, and
      where the same base component that is configured to mate with the riser component to implement the stand riser assembly configuration is also configured to electrically and mechanically mate instead without the riser component to the display component and to mechanically mate between the display monitor head component and a support arm component to implement an arm mount assembly configuration; and performing at least one of the following two steps:
implementing the stand riser configuration by electrically and mechanically mating the base component with the riser component and electrically and mechanically mounting the riser component to the display monitor head component with the riser component positioned between the base component and the display monitor, or implementing the arm mount assembly configuration by electrically and mechanically mating the base component to the display monitor head component and mechanically mounting the base component to the support arm component such that the base component is mechanically coupled between the display monitor head component and the support arm component.

15. The method of claim 14, further comprising coupling the base component electrical components to make one or more electrical connections that are external to components of the modular display system.

16. The method of claim 14, further comprising coupling the base component electrical components to make one or more electrical connections to one or more information handling system components that are external to components of the modular display system.

17. The method of claim 14, where the display monitor head component has a viewing side and a rear side and the one or more integrated display monitor electrical components are electrically coupled to at least one monitor electrical interconnect disposed on the rear side of the display monitor head component; where the base component has an upper side and a lower side and the one or more integrated base component electrical components are electrically coupled to at least one base component electrical interconnect disposed on the upper side of the base component; and where the method further comprises:
mechanically mating the upper side of the base component with the rear side of the display monitor head component and electrically mating the base component electrical interconnect with the monitor electrical interconnect to electrically couple the base component electrical components to the display monitor electrical components.

18. The method of claim 17, further comprising coupling the base component electrical components to make one or more electrical connections to one or more information handling system components that are external to the modular display system.

19. The method of claim 17, further comprising mechanically mating the lower side of the base component with a first end of a support arm; and attaching a second and opposite end of the support arm to a supporting surface by fasteners or adhesive to implement the support arm configuration to support the mated base component and display monitor head component assembly with the display monitor head component suspended in a viewing position for a user.

20. The method of claim 17, further comprising:
implementing the stand riser configuration by the steps of:
mechanically mating the rear side of the display monitor head component with a first end of the riser component and electrically mating the monitor interconnect with at least one corresponding first riser electrical interconnect disposed adjacent the first end of the riser component when the rear side of the display monitor head component is mechanically mated to the first end of the riser component, and mechanically mating the upper side of the base component with a second and opposite end of the riser component and electrically mating the base component electrical interconnect with at least one corresponding second riser electrical interconnect disposed adjacent the second end of the riser electrical component when the upper side of the base component is mechanically mated with the second end of the riser component and at the same time that the rear side of the display monitor head component is mechanically mated with first end of the riser component;

where the first riser electrical interconnect is electrically coupled though the riser component to the second riser electrical interconnect to electrically couple the integrated display monitor electrical components to the integrated base component electrical components.

21. The method of claim 20, further comprising freely resting the lower side of the base component upon a substantially horizontal support surface to support the mated riser component and display monitor head component assembly with the display monitor head component suspended in a viewing position for a user.

22. The method of claim 14, where the display monitor head component has a viewing side and a rear side and the one or more integrated display monitor electrical components are electrically coupled to at least one monitor electrical interconnect disposed on the rear side of the display monitor head component; where the base component has an upper side and a lower side and the one or more integrated base component electrical components are electrically coupled to at least one base component electrical interconnect disposed on the upper side of the base component; and where the method further comprises:
implementing the stand riser configuration by the steps of:
mechanically mating the rear side of the display monitor head component with a first end of the riser component and electrically mating the monitor interconnect with at least one corresponding first riser electrical interconnect disposed adjacent the first end of the riser component when the rear side of the display monitor head component is mechanically mated to the first end of the riser component, and mechanically mating the upper side of the base component with a second and opposite end of the riser component and electrically mating the base component electrical interconnect with at least one corresponding second riser electrical interconnect disposed adjacent the second end of the riser electrical component when the upper side of the base component is mechanically mated with the second end of the riser component and at the same time that the rear side of the display monitor head component is mechanically mated with first end of the riser component;

where the first riser electrical interconnect is electrically coupled though the riser component to the second riser electrical interconnect to electrically couple the integrated display monitor electrical components to the integrated base component electrical components.

23. The method of claim 22, further comprising freely resting the lower side of the base component upon a substantially horizontal support surface to support the mated riser component and display monitor head component assembly with the display monitor head component suspended in a viewing position for a user.

24. The method of claim 14, further comprising performing both of the following two steps to transform the modular display system from the stand riser configuration to and the arm mount assembly configuration:

implementing the stand riser configuration by electrically and mechanically mating the base component with the riser component and electrically and mechanically mounting the riser component to the display monitor head component with the riser component positioned between the base component and the display monitor without the presence of the support arm component; and     then implementing the arm mount assembly configuration by unmating the riser component from the display monitor head component and removing the riser component from position between the base component and the display monitor, and then repositioning and electrically and mechanically mating the base component to the display monitor head component and mechanically mounting the base component to the support arm component such that the base component is mechanically coupled between the display monitor head component and the support arm component to implement the arm mount assembly configuration without the riser component.

25. The method of claim 14, where the display monitor head component has a rear surface; and where the method further comprises implementing the arm mount assembly configuration by electrically and mechanically mating the base component directly to rear surface of the display monitor head component.

26. The method of claim 11, where the riser component and the support arm component are separate and different components that are each removable from the base component.

\* \* \* \* \*